V. ROYLE.
MACHINE FOR REPEATING JACQUARD CARDS.
APPLICATION FILED NOV. 10, 1905.

930,694.

Patented Aug. 10, 1909.
7 SHEETS—SHEET 1.

Fig. 1.

Witnesses:

Inventor:
Vernon Royle
By Brown & Seward
his Attorneys

V. ROYLE.
MACHINE FOR REPEATING JACQUARD CARDS.
APPLICATION FILED NOV. 10, 1905.

930,694.

Patented Aug. 10, 1909.
7 SHEETS—SHEET 3.

Witnesses:

Inventor:
Vernon Royle
By Brown & Seward
his Attorneys

Fig. 4.

V. ROYLE.
MACHINE FOR REPEATING JACQUARD CARDS.
APPLICATION FILED NOV. 10, 1905.

930,694.

Patented Aug. 10, 1909.
7 SHEETS—SHEET 5.

Fig.5.

V. ROYLE.
MACHINE FOR REPEATING JACQUARD CARDS.
APPLICATION FILED NOV. 10, 1905.

930,694.

Patented Aug. 10, 1909.
7 SHEETS—SHEET 6.

Witnesses:

Inventor:
Vernon Royle
By Brown & Seward
his Attorneys

V. ROYLE.
MACHINE FOR REPEATING JACQUARD CARDS.
APPLICATION FILED NOV. 10, 1905.

930,694.

Patented Aug. 10, 1909.
7 SHEETS—SHEET 7.

Witnesses:

Inventor:
Vernon Royle
By Brown Seward
his Attorneys

UNITED STATES PATENT OFFICE.

VERNON ROYLE, OF PATERSON, NEW JERSEY.

MACHINE FOR REPEATING JACQUARD-CARDS.

No. 930,694.　　　　Specification of Letters Patent.　　　　Patented Aug. 10, 1909.

Application filed November 10, 1905.　Serial No. 286,648.

*To all whom it may concern:*

Be it known that I, VERNON ROYLE, a citizen of the United States, and resident of Paterson, in the county of Passaic and State of New Jersey, have invented a new and useful Machine for Repeating Jacquard-Cards, of which the following is a specification.

My invention relates to a machine for repeating jacquard cards and more particularly to a machine of this character adapted to be operated by hand power.

In the accompanying drawings.

The following general features, to wit; tracks for the pattern and blank cards mounted to move simultaneously toward and away from each other to bring the selecting needles and punches into action and to throw them out of action; feed mechanism operated by the movable tracks and cam wheels for operating the tracks, are not of my invention except so far as they intimately coact with the several features hereinafter particularly described and claimed.

My present invention is directed to an arrangement of the punches by which a bank of punches, corresponding in number to a full transverse series of holes in the pattern card, may be manipulated to cut series of holes in close proximity to and on opposite sides of the peg hole; to a card regulating stop which coacts with lace hole punching mechanism for automatically throwing the lace hole punches out of action and to card tracks capable of lateral extension and contraction to suit different widths of cards.

The frame of the machine conveniently consists of a pair of uprights 1, 2, here shown as circular in cross section, fixed to a base 3, and connected at the top by an arch bar 4. The tracks for supporting the pattern and blank cards are mounted on the uprights 1 and 2, the one by means of connected sleeves 5 and 6, and the other by means of connected sleeves 7 and 8. Intermediate their ends and between the respective track supporting sleeves, the uprights are provided with laterally extended portions 9 and 10 through which the drive shaft 11 extends. The shaft 11 has a combined crank and fly wheel 12 secured on one end, and, in proximity to the uprights, the said shaft is provided with cam wheels 13 and 14 for operating the tracks. In the present instance, the cam wheels are oval and each revolution operates the tracks twice toward and away from each other. The cam wheels are provided with grooves denoted, respectively, by 15 and 16, which receive rollers 17, 18, mounted on the sleeves 5 and 6 and rollers 19, 20, mounted on the sleeves 7 and 8.

The two tracks, the one for the pattern cards and the other for the blank cards to be punched, are quite similar in construction and a detailed description of one will answer for both. The upper track consists of wings 21, 22, fixed to and extending in opposite directions from the connected sleeves 5 and 6. 21 for the purpose of bringing the cheek pieces 23, 24, provided with dove-tailed or under-cut tongues 25, 26, arranged to slide transversely in a dove-tailed or under-cut groove 27 formed transversely in the wing 21 for the purpose of bringing the cheek pieces nearer to or farther away from each other as may be desired to suit different widths of pattern cards. These cheek pieces are conveniently locked in the desired adjustment by means of thumb screws 28, 29. In like manner, the wing 22 is provided with cheek pieces 30, 31, having under-cut or dove-tailed tongues 32, 33, which slide transversely in a dove-tailed or under-cut groove 34 formed in the wing 22, the said cheek pieces being locked in the desired adjustment by means of thumb screws 35, 36.

By the above arrangement, the pattern card may be held securely in position throughout its travel past the group of selecting needles since its bearing against the cheek pieces on one side of the feed mechanism will be sufficiently extended to hold it against lateral displacement until it reaches the cheek pieces on the opposite side. In like manner, the lower track for supporting the blank cards to be punched is provided with wings fixed to and extending in opposite directions from the connected sleeves 7 and 8, each wing being provided with a pair of adjustable cheek pieces for the purpose of holding the blank cards accurately in position in the same manner as hereinabove explained with respect to the pattern cards.

Figure 1:
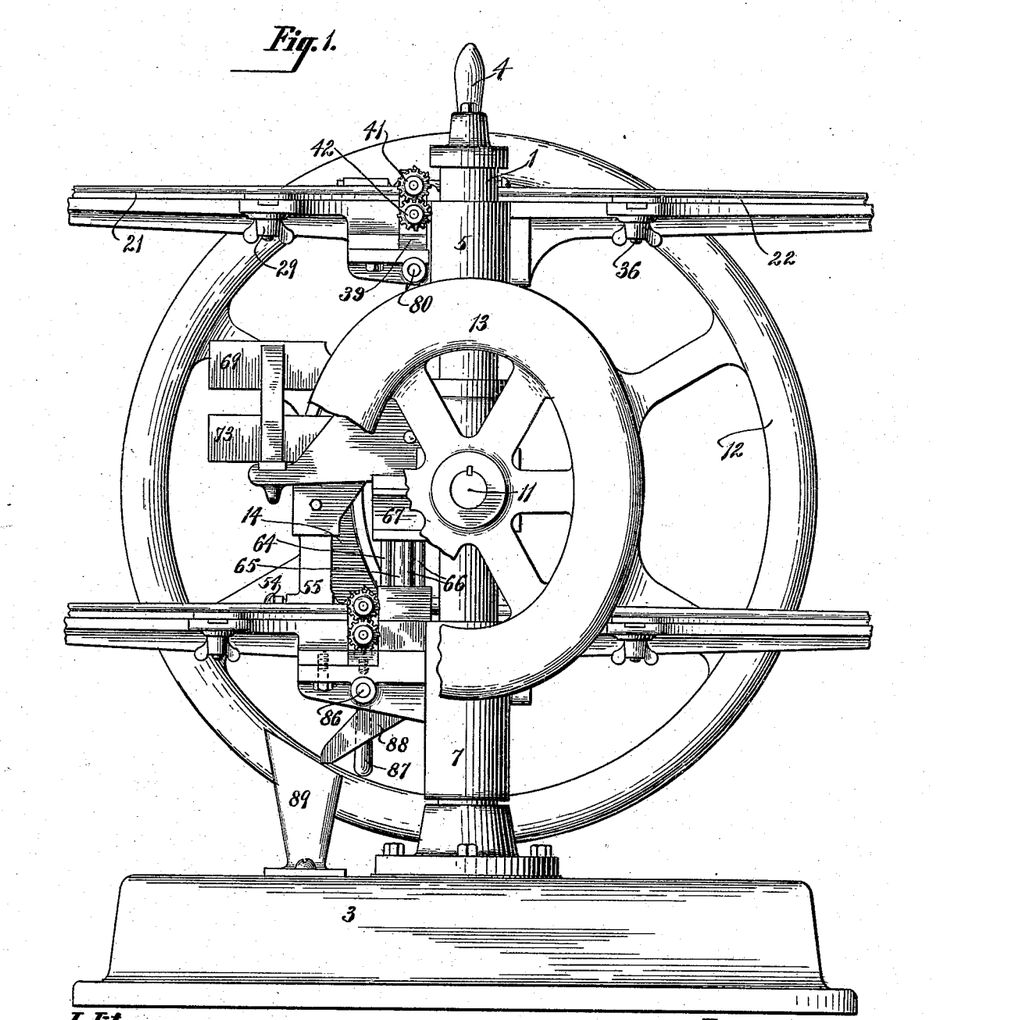
Figure 1 is a view of the machine in side elevation partly broken away, the view being taken on the side opposite that on which the power is applied.
Figures 11, 12:
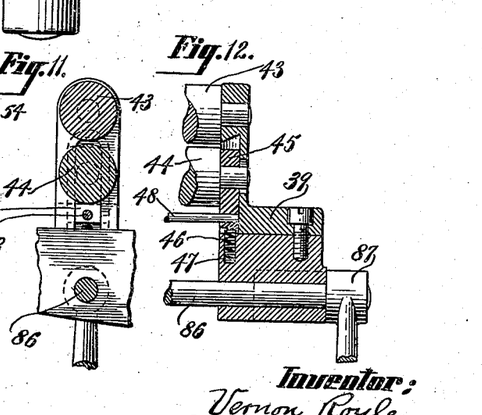
Fig. 11 is an enlarged transverse section through the feed rolls.
Fig. 12 is a partial vertical section through the feed roll bearing and support for the card regulating stop.

The pattern cards are fed step by step as follows:—Two feed rollers, 37, 38, each provided with suitable knurled or friction surface, are mounted one above the other in suitable bearings 39, 40, fixed to move bodily up and down with the track. These rollers are geared to rotate with equal facility by intermeshing gear 41, 42, see Fig. 1, and the lower roller 38 is further permitted a yielding movement bodily toward and away from the upper roller 37 by means of sub-bearings mounted in bearings 39, 40, in a manner shown clearly in detail in Figs. 11 and 12 where the feed rolls for feeding the blank cards to be punched are denoted by 43, 44, and are geared together in the same manner as the feed rolls 37, 38, for the pattern cards, the lower roll 44 being mounted in yielding sub-bearings one of said bearings being shown at 45 and the bearing at the opposite end of the roller not shown being in all respects like the bearing 45, the said sub-bearings being connected with the main bearing by means of an under-cut or dove-tailed connection and constantly pressed in a direction to force the lower roller 44 toward the upper roller 43 by means of springs 46, it being assumed that a spring similar to the spring 46 is located at the opposite end of the roller and in precisely the same relation to the sub-bearing, seated in sockets 47 and bearing against the under side of the sub-bearing 45. These sub-bearings 45 are connected by a rod 48 extending transversely across the machine from one to the other for connecting them to move together and for furnishing a bearing on which the card regulating stop acts at the moment of starting the punching of a card as will be hereinafter more particularly explained.

Figure 2:
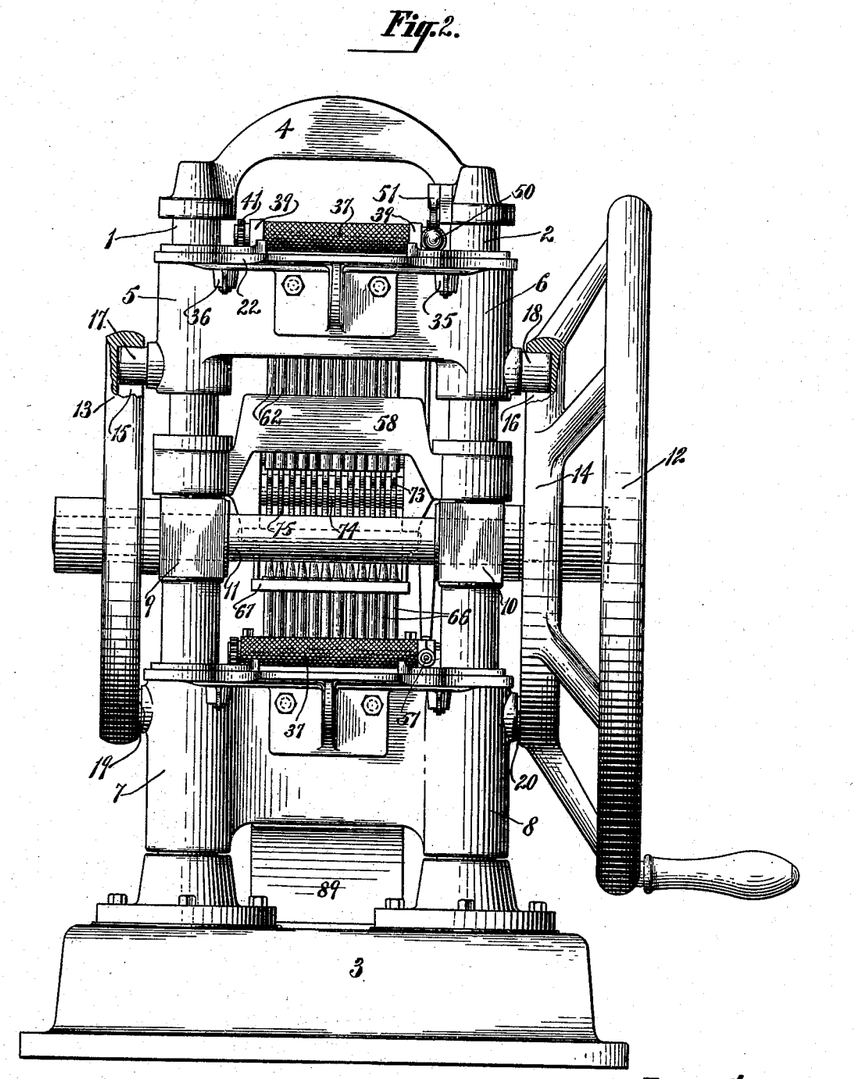
Fig. 2 is a view in end elevation, partly broken away.
Figure 3:
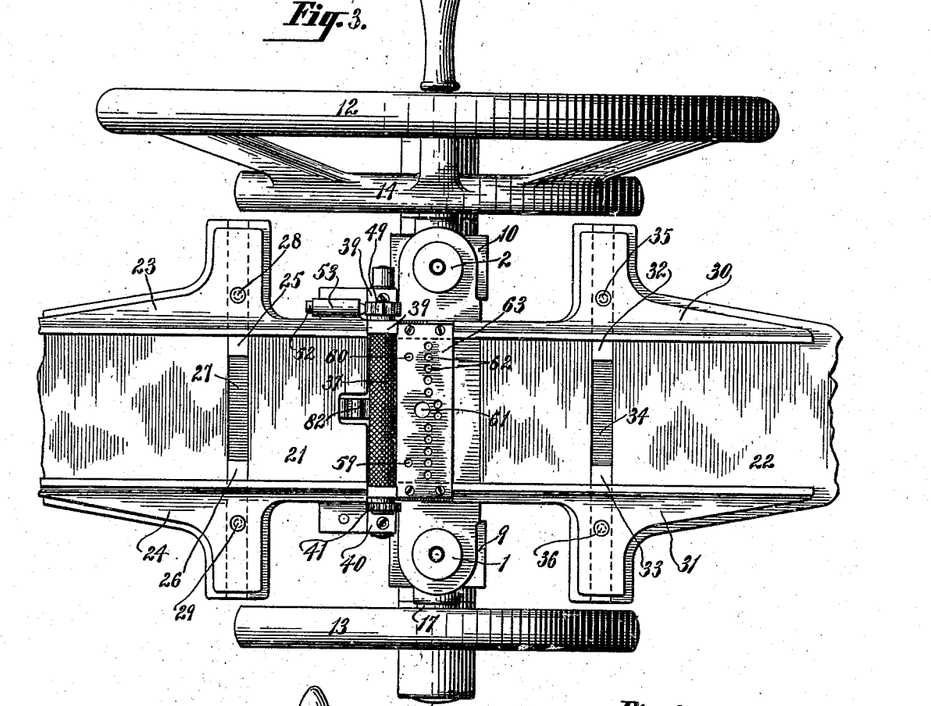
Fig. 3 is a top plan view with the arch bar removed.
Figure 4:
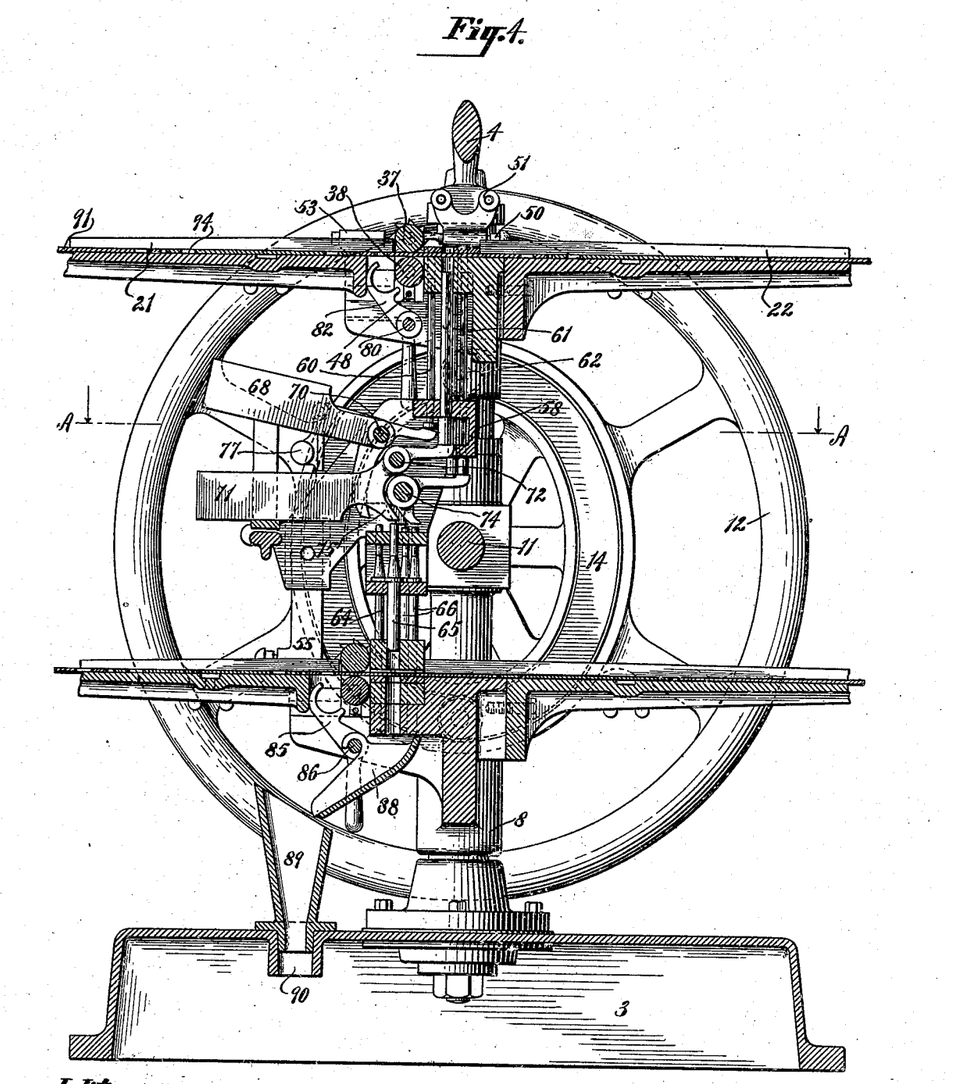
Fig. 4 is a central vertical section from end to end showing the positions of the parts when the pattern card has just been fed a step forward in position to determine the punching of the new card at that step.
Figure 5:
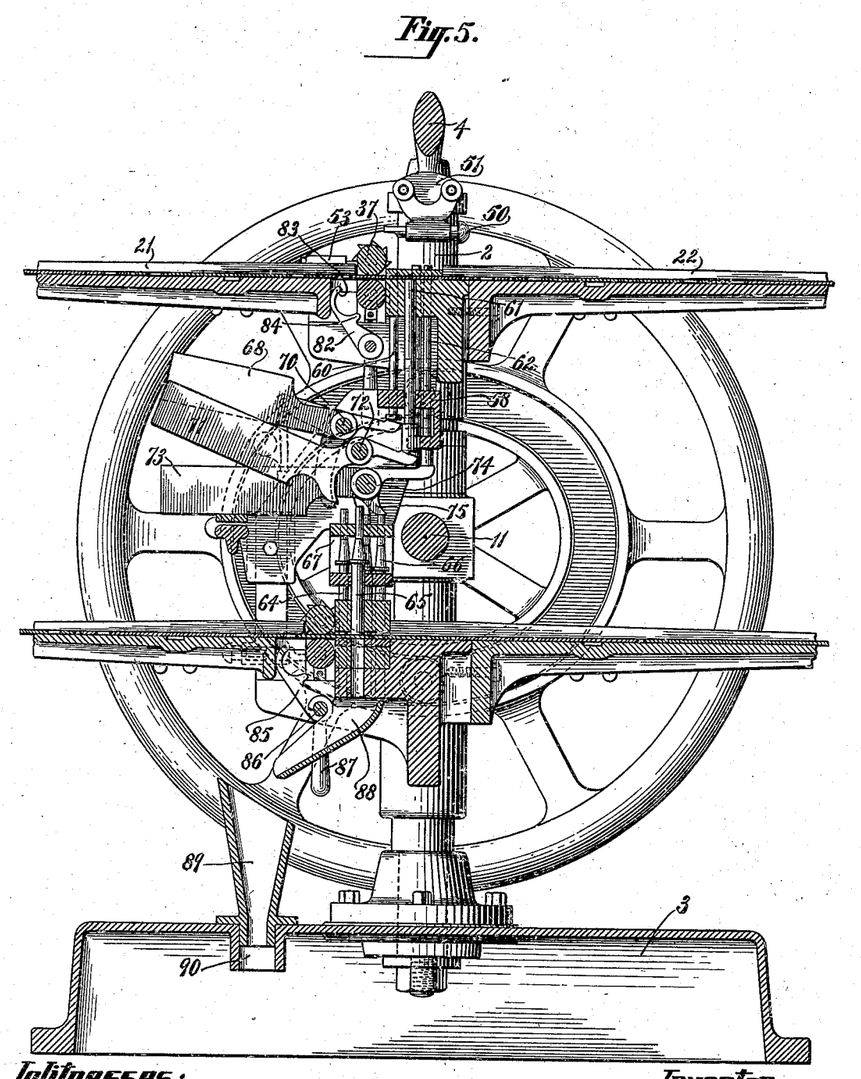
Fig. 5 is a similar view showing the positions of the parts at the moment the punching of the card at that step has been completed.
Figure 6:
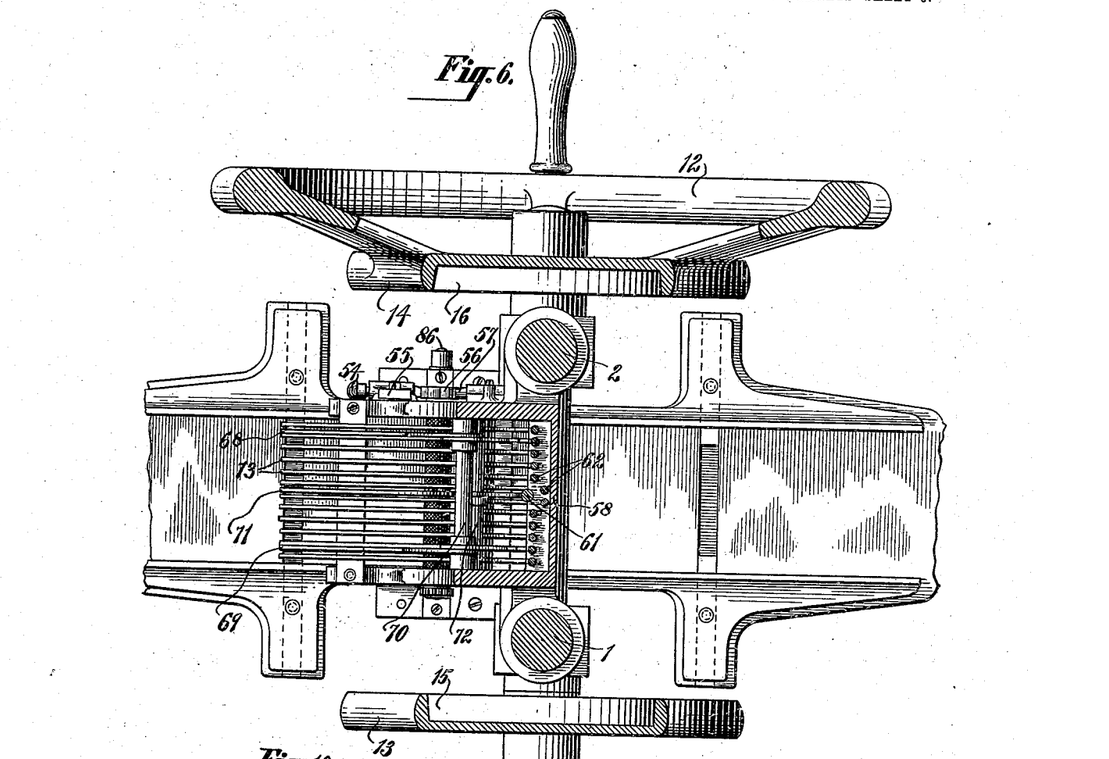
Fig. 6 is a horizontal section in the plane of the line A—A, Fig. 4.
Figures 7, 8, 9:
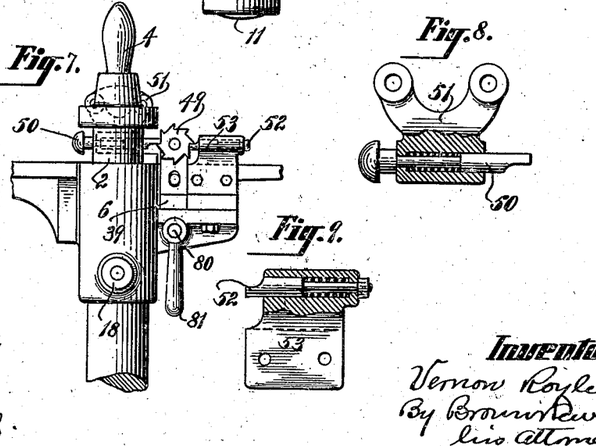
Fig. 7 is a partial side elevation, taken on the side on which the power is applied, the crank wheel and cam wheel being removed, showing the mechanism for advancing the pattern card a step.
Fig. 8 is a view of the operating dog or pawl in detail showing its bearing in section.
Fig. 9 is a view of the releasing pawl, showing its bearing in section.
Figure 10:
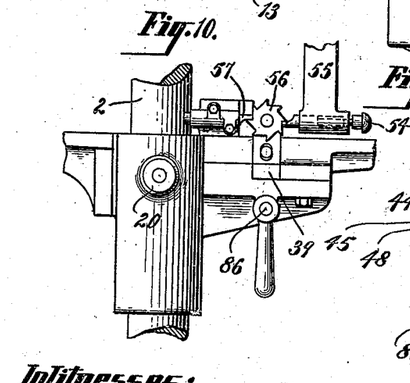
Fig. 10 is a partial side elevation, showing the mechanism for advancing the blank card a step.

The upper roller 37 is provided at its end opposite the gear 41 with a ratchet toothed wheel 49, the teeth of which are engaged by a spring actuated dog 50 seated in a bracket 51 fixed to the end of the arch bar 4 as clearly shown in Figs. 2 and 4. The manner in which this dog 50 is mounted in the bracket 51 is shown in detail in Fig. 8. The ratchet toothed wheel 49 is further engaged by a spring actuated retaining dog 52 mounted in a suitable bracket 53 fixed to move with the track. The relative position of these two dogs or pawls (the operating and the retaining dog,) is clearly shown in detail in Fig. 7.

As the connected sleeves 5 and 6 are moved upwardly the ratchet toothed wheel 49 is lifted into engagement with the operating dog 50 and the feed rollers are thereby turned one step, the retaining dog 52 riding over a tooth on the opposite side of the ratchet toothed wheel and retaining the wheel in the position into which it has been moved by the operating dog 50 during the downward movement of the track away from the operating dog 50. In precisely the same manner, the feed rolls 43, 44, are operated one step to feed the blank card when the lower track approaches the limit of its downward movement, by means of an operating dog 54 mounted in a stationary bracket 55 depending from the frame of the machine which engages a ratchet toothed wheel 56 carried by the upper roller 43, a retaining dog 57 carried by the lower track serving to hold the ratchet wheel 56 in the position in which it is turned during the upward movement of the lower track to effect the punching operation.

The selecting needles for coöperating with the pattern card are suitably supported in a channel beam 58 extending in arch form, as shown in Fig. 2, between the uprights 1 and 2 and consist of two for controlling the lace hole punches, one for controlling the peg hole punch and twelve for controlling the pattern hole punches. The two needles for controlling the lace hole punches are denoted by 59, 60, the one for controlling the peg hole punch by 61 and the group of twelve for controlling the pattern hole punches by 62. While I have shown twelve for controlling the pattern hole punches, it is obvious that this number might be increased or diminished at pleasure to suit the requirements of a full line of pattern holes transversely across the card. My present invention is directed to the arrangement of these needles with respect to one another and particular attention is called to the position of the two middle needles of the group 62 which are set out of transverse alinement with the remaining ten thereby admitting the needle 61 for controlling the peg-hole punch to occupy a position close to the line of pattern hole needles and furthermore the lace hole controlling needles are of the same size as and located in longitudinal alinement with certain of the pattern hole needles for reasons which will hereinafter appear.

Over the upper ends of the selecting needles and spaced above the track to permit the pattern card to pass beneath it there is a plate 63 provided with holes therethrough corresponding in size and arrangement to the size and arrangement of the selecting needles so that the pattern card, passing beneath the plate, when in position with any of the holes therein registering with the holes in the plate 63, will permit the selecting needles to pass freely up through the card and through the plate 63 and such passage of the selecting needles will leave the corresponding punch locked in position to punch a hole in the blank card by means of the following mechanism:—Lace hole punches 64, a peg-hole punch 65 and pattern punches 66 are supported in a channel bar 67 extending transversely between the uprights 1 and 2, the said lace hole, peg and pattern punches being arranged in the same manner as the selecting needles and corresponding to the holes in the plate 63.

Intermediate of the group of selecting needles and the group of punches there is a series of weighted locking levers, the two locking levers for coacting with the lace hole selecting needles and lace-hole punches being denoted by 68, 69, and fulcrumed on a transverse bar 70, the locking lever for coacting with the peg-hole selecting needle and punch being denoted by 71 and fulcrumed on a cross bar 72 and the levers for coacting with the pattern hole selecting needles and punches being denoted by 73 and fulcrumed on a cross bar 74.

All of the weighted locking levers have their short arms in position to be acted on directly by the respective selecting needles and each is provided with an extended foot 75 adapted to rest when the lever is in its normal position, in the present instance substantially horizontal, over the end of a punch and thereby lock the punch against an upward sliding movement when brought into engagement with the blank card and thus causing it to cut a hole in the card. When, however, a selecting needle is brought into engagement with a blank space on the pattern card and is not permitted to slide up through the card and through the plate 63, the said selecting needle will tilt its locking lever thereby throwing the foot off its corresponding punch, permitting the latter to lift when brought into contact with the face of the blank card and so producing no cut in the card.

In practice, it is important that the lace hole punches be thrown out of cutting adjustment after they have once cut the lace holes and such temporary release of these punches is effected by holding their weighted locking levers in tilted position with their feet 75 removed from over the respective punches when the selecting needles engage the blank spaces on the pattern card at the step next succeeding that during which the lace holes were punched in the entering end of the card. To accomplish this, the bar 70, which is a rock bar and to which the weighted locking levers 68 and 69 are secured, is provided with an arm 76, see Fig. 13, to the free end of which there is hinged a weighted hanger 77, the lower end of which, under the influence of gravity, will seat on a step 78 on the frame, as shown in Fig. 14, whenever permitted so to do by the lifting of the lever 68 and rocking of the shaft 70 and hence of the arm 76 to raise the lower end of the hanger 77 above the surface of the step 78. Such tilting movement is effected by the pressure of the lace hole selecting needle when it strikes a blank space on the pattern card which will be immediately after the lace holes have been punched in the end of the card. To throw these locking levers 68, 69, in position to lock their respective punches at the beginning of the cutting of a card, a tripping arm 79 is fixed to and extended downwardly from a rock shaft 80, the latter being provided with a handle 81 for manipulating it.

Figure 13:
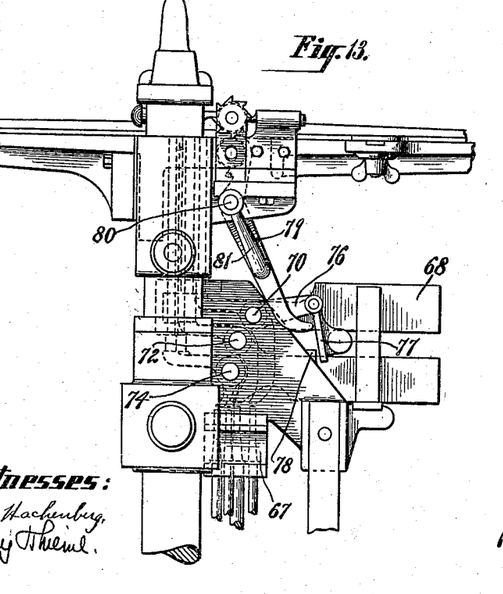
Fig. 13 is a partial elevation, the crank and cam wheel being removed, showing the position of the parts when the lacing holes are to be punched.
Figure 14:
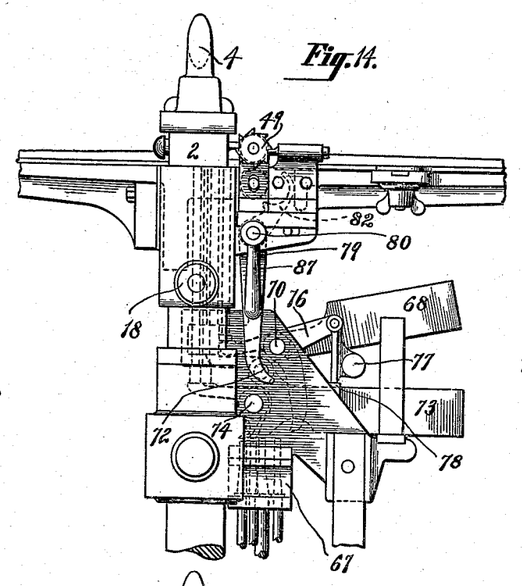
Fig. 14 is a similar view showing the position of the parts immediately after the lacing holes have been punched.

When the shaft 80 is turned in the position shown in Fig. 13, the trip arm 79 presses against the hanger 77 throwing it off the step thereby permitting the locking levers 68, 69, to drop into locking position with respect to the lace hole punches. At the same time, the shaft 80 is utilized as a support for a card regulating stop 82 preferably secured to the rock shaft 80 about midway of its length and provided with a lip 83 in position to enter the space between the feed rollers up to a point just back of the plane of the axes of the rollers to form a stop for the end of the entering card when the pattern card is adjusted to begin the punching operation.

The regulating stop 82 is limited in its swinging movement by the engagement of a nose 84 thereon with the rod 48 hereinabove referred to, the said nose 84 as it is forced over the top of the rod 48 serving to draw down on the bearings 45 with which the rod 48 is connected thus drawing the lower feed roller against the tension of its spring cushion slightly away from the upper feed roller to permit the end of the card to be readily adjusted between the two.

The rocking of the shaft 80 by means of the handle 81 in a direction as shown in Fig. 13 to bring the regulating stop into position between the rollers and to separate them for adjusting the card, swings the trip arm 79 into the position shown in Fig. 13, to trip the hanger 77 so that when the tracks carrying the pattern and blank cards are first caused to approach each other after the card has been set, the lace-hole punches will be locked and will perform the punching operation. As soon as the card has been adjusted with its end against the stop, the latter is manually swung back permitting the rollers to grip the card and at the same time swinging the trip arm 79, leaving the hanger 77 free to seat on the step 78 when operated by the selecting needles, and thus hold the lace hole punches out of punching adjustment until a succeeding pattern card is placed in position. The same operation, so far as the regulating stop is concerned, is repeated with respect to the blank card where the said stop is indicated by 85 fulcrumed on the shaft 86 operated by a handle 87. This shaft 86 does not, however, require any tripping arm attached thereto as the one serves to throw the locking levers out of position to lock the lace hole punches.

By arranging the lace hole punches in alinement with two of the pattern hole punches, the latter may be employed to punch the lace holes at the opposite end of the card since all the other punches of the pattern hole group will be opposite blank spaces in the pattern card save these two which correspond to the lace holes in the pattern card and they will lock their respective punches and thus finish the punching of that end of the card so that no adjustment of the lace hole locking levers hereinabove explained will be required until another card is entered. The chips from the blank card which is being punched are received in a tray 88 and by it directed to a spout 89 which conveys them to an opening 90 in the top of the base 3 where they may be collected in any suitable vessel, not shown.

Figure 15:
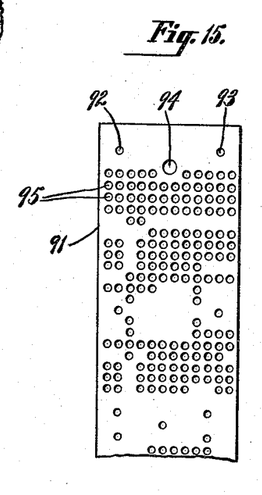
Fig. 15 is a partial plan view of a card showing the relation of the lacing, peg and pattern holes.

In Fig. 15 a part of a pattern card 91 is shown, the lace holes therein being denoted by 92, 93, the peg-hole by 94 and the pattern holes by 95.

In operation, the parts being in the position shown in Fig. 13, the pattern card is laid on its track and the cheek pieces adjusted to correspond to its width, the end of the pattern card being inserted between the feed rollers and engaged with the lip 83 on the regulating stop 82. In like manner, the blank card to be punched is laid on the lower track, the cheek pieces adjusted to suit its width and its end inserted between the feed rollers in engagement with the lip on the lower regulating stop 85. The crank wheel 12 is then turned, its first quarter revolution causing by means of oval cams 13 and 14 the upper and lower tracks with the cards thereon to approach each other, the lace-hole selecting needles passing upwardly through the lace-holes 92, 93, in the pattern card and through the corresponding holes in the guide plate 63 thereby leaving the lace-hole punches locked and punching the lace-holes in the blank card. At the same time, the peg-hole selecting needle will pass through the peg-hole 94 in the pattern card and the selecting needles for the pattern holes will pass through the groups of five in proximity to the peg-hole and through the two middle pattern-holes in the next succeeding row thus locking the punches and punching, at the first approach of the tracks, the two lace-holes, the peg-hole, the ten holes, five on each side of the peg-hole, and the two middle holes of the next succeeding row. During the next quarter revolution, the tracks will be moved apart from each other and the selecting needles and punches thereby withdrawn from their respective cards. This movement will also, by means of the dogs engaged with the ratchet wheels, advance both the pattern and the blank card one step and will, by the engagement of the pattern card with the regulating stop, rock the shaft 80 in a direction to remove the trip arm 79 from the path of the depending hanger 77. The third quarter revolution of the crank wheel will again cause the tracks and the cards thereon to approach each other and the selecting needles for the lace-hole punches will at this step engage the blank spaces on the pattern card and will tilt their respective locking levers thereby throwing the hanger 77 onto its step 78 and holding the rock shaft 70 and hence the locking levers 68 and 69 tilted in the position shown in Fig. 14, with their locking feet removed from over the lace-hole punches so that the lace-hole punches will be put out of action. The peg-hole punch will also be put out of action because its selecting needle will no longer find an opening in the pattern card sufficiently large to permit it to pass but the pattern hole selecting needles will, ten of them, complete the second row of pattern-holes by punching five on each of the two opposite sides of the two which were previously punched and will, at the same time, punch the two middle holes of the next succeeding row. In this manner, assuming the pattern to be punched with a complete line of holes at every step, the punching may continue until the opposite end of the card is reached where the peg-hole selecting needle will finally find its opening in the pattern card and punch the peg-hole, the two off-set pattern selecting needles finding a blank space and being thrown out of action at the last step while the pattern hole punches at opposite sides thereof will complete the final row. At one or two succeeding steps thereafter, as the case may be, two of the pattern hole punches will be locked by the selecting needles corresponding to the two lace-holes and the lace-holes will be punched to complete the card.

It is to be understood that a complete row across the card or a partial row or a blank without any punching may result from the particular arrangement of holes in the pattern card, only such punches punching the blank card as may become locked because of their selecting needles passing through corresponding holes in the pattern card.

What I claim is:—

1. In a machine for repeating jacquard cards, a peg hole punch and a transverse series of pattern hole punches in close proximity to the transverse line in which the peg hole punch is located, the said transverse series of pattern hole punches being interrupted in the vicinity of the peg hole punch and certain of the punches employed to complete the said transverse series of pattern hole punches being offset from the series in the longitudinal direction of the card where the series is interrupted, selecting needles similarly arranged and means under the control of the selecting needles for locking the punches and releasing them.

2. In a machine for repeating jacquard cards, lace-hole punches, pattern-hole punches, selecting needles for the respective punches, means under the control of the selecting needles for locking and releasing the punches and means for maintaining the lace-hole punches inactive after they have once acted.

3. In a machine for repeating jacquard cards, lace-hole punches, pattern-hole punches, selecting needles for the respective punches, means under the control of the selecting needles for locking and releasing the punches and means for automatically maintaining the lace-hole punches inactive after they have once acted.

4. In a machine for repeating jacquard cards, the combination with a selecting needle, a punch and a weighted punch locking lever intermediate the selecting needle and punch, of a hanger for holding the locking lever out of locking adjustment and a trip lever under the control of the operator for engaging the hanger and permitting the locking lever to tilt into locking adjustment.

5. In a machine for repeating jacquard cards, the combination with a selecting needle, a punch and a locking lever interposed between the selecting needle and punch, of a device for holding the locking lever out of locking adjustment, a trip lever for engaging said device, and a card regulating stop fixed to move the said trip lever, the said card regulating stop being under the control of the card to swing the trip lever in one direction and under the control of the operator to swing the trip lever in the opposite direction.

In testimony, that I claim the foregoing as my invention, I have signed my name in presence of two witnesses, this 30th day of October, 1905.

VERNON ROYLE.

Witnesses:
ELIAS BROWN KING,
ED. T. LARSEN.